United States Patent [19]

Broome

[11] Patent Number: 4,636,938

[45] Date of Patent: Jan. 13, 1987

[54] METHOD AND APPARATUS FOR PRODUCING NUMERICAL CONTROL PROGRAMS

[75] Inventor: Peter F. Broome, Cincinnati, Ohio

[73] Assignee: Cincinnati Milacron Inc., Cincinnati, Ohio

[21] Appl. No.: 646,651

[22] Filed: Aug. 31, 1984

[51] Int. Cl.⁴ .............................................. G05B 19/18
[52] U.S. Cl. ..................................... 364/191; 364/171
[58] Field of Search ............... 364/188, 189, 191, 192, 364/474; 171, 475; 318/567, 568

[56] References Cited

U.S. PATENT DOCUMENTS

| | | | |
|---|---|---|---|
| 4,281,379 | 7/1981 | Austin | 364/132 |
| 4,399,502 | 8/1983 | MacDonald | 364/189 |
| 4,479,197 | 10/1984 | Hagg | 364/900 |
| 4,490,781 | 12/1984 | Kishi | 364/191 |
| 4,513,366 | 4/1985 | Munekata | 364/191 |
| 4,519,026 | 5/1985 | Nozawa | 364/189 |
| 4,521,860 | 6/1985 | Kanematsu | 364/191 |
| 4,530,046 | 7/1985 | Munekata | 364/474 |
| 4,547,854 | 10/1985 | Hashimoto | 364/474 |
| 4,549,270 | 10/1985 | Fukumura | 364/191 |
| 4,556,833 | 12/1985 | Kishi et al. | 318/567 |
| 4,558,419 | 12/1985 | Kanematsu | 364/474 |

FOREIGN PATENT DOCUMENTS 0076328  4/1983  European Pat. Off. ............ 364/191

Primary Examiner—Jerry Smith
Assistant Examiner—Allen MacDonald
Attorney, Agent, or Firm—John W. Gregg

[57] ABSTRACT

An apparatus and method are provided for creating and revising programs for numerically controlled machines. First, generalized data block signals are produced, the generalized data block signals representing alphanumeric words defining block types, workpiece material types, work surfaces, workpiece features and machining operations. Then, machine control instruction block signals are produced in response to the generalized data block signals, the machine control instruction block signals represent alphanumeric words defining machine member motion in the form and format required by a particular numerical control. The generalized data program may be created by a machine operator using data obtained from the workpiece design data. Generalized data program creation and revision is accomplished without regard for the data requirements and limitations of a particular machine and control combination by which the workpiece is to be processed.

22 Claims, 8 Drawing Figures

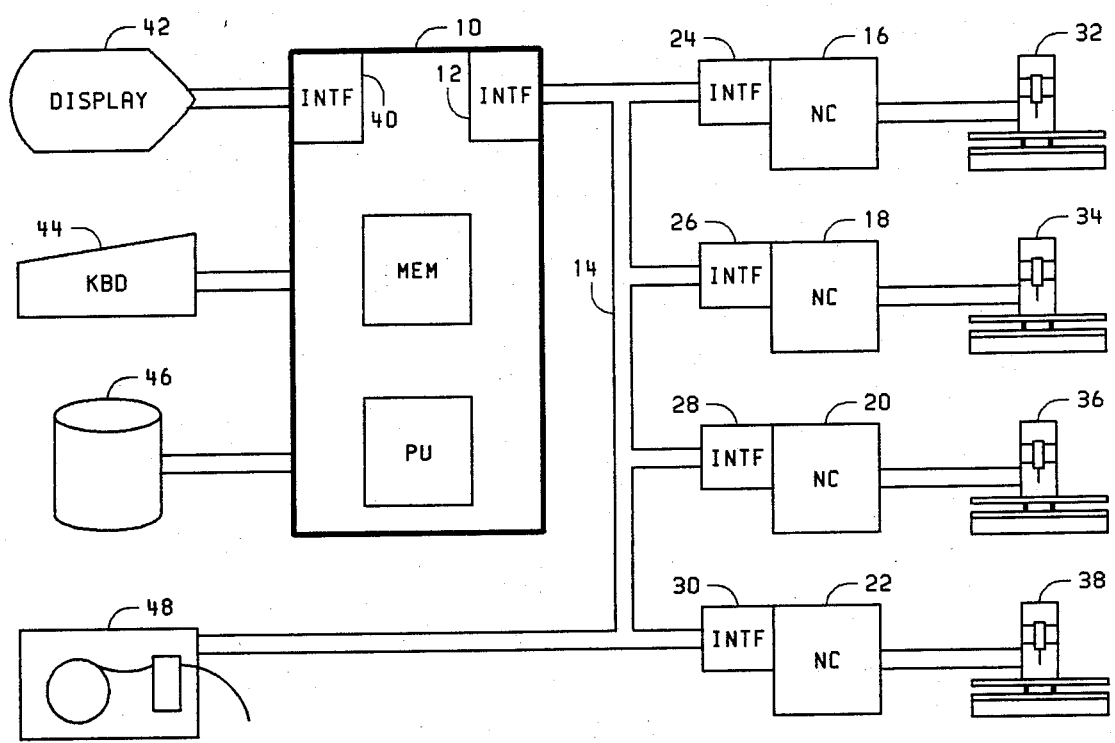
FIG.1
FIG.2
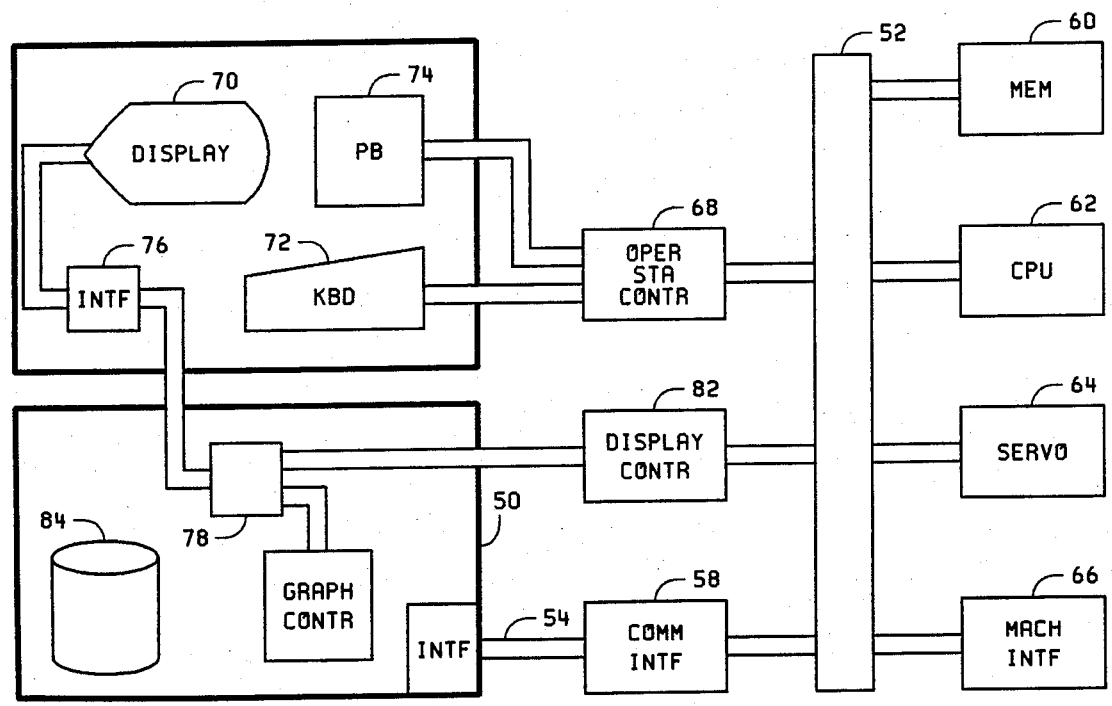

METHOD AND APPARATUS FOR PRODUCING NUMERICAL CONTROL PROGRAMS

BACKGROUND OF THE INVENTION

This invention relates generally to numerical control of machines. In particular this invention relates to the creation and revision of programs for numerically controlled machines.

Numerically controlled machines generally require an input program comprising a set of machine instructions which define machine activity using elementary data definitions. The program describes machine member motion by defining location coordinate data and feed rates. Machine spindle speeds, predefined cycles of operation, and miscellaneous functions are all commanded by code words comprising a single alphabetic address and a plurality of numeric digits designating the particular speed, cycle, or function, respectively. Although standards exists defining various program words by their general function, machine controls from different vendors and different controls from the same vendor often exhibit differences in operation in response to these standardized program data. Further, program creation typically requires the use of computer aided programming systems to produce the location coordinate data required by the control. Final formatting of program data to the input required by a particular machine and control combination is performed automatically by a postprocessor which converts the motion, cycle, and function commands to the necessary form and format. The programming function is, therefore, performed on equipment which operates independently of the machine control for which the program is being generated. Any data pertaining to the machine and control combination or to tools to be resident on a particular machine must of necessity to supplied to the programming equipment from sources other than the machine control.

It has become common practice for a programmer to create the machine control program by first creating a high level language program which is then processed and postprocessed to produce the machine control program. In general, the source level program is created using a special language which is known to the programmer but which would be unfamiliar to a machine operator who is skilled at interpreting part drawings for machining operations. The source level language program is therefore usable only by the programmer working with computer based programming equipment. Revisions of the copy of the machine control program stored at the control may be made only by the relatively cumbersome facility available for program revision at the control. Revisions which are implemented in this manner leave the source level program unchanged. Consequently, machine control programs prepared from the unchanged source level program will include the same defects that have been corrected at the machine control program level. The existing programming procedures thus lead to a division of resources and skills between the programming functions and the operation of the machines. These procedures also increase the probability that a program change or correction found necessary by a machine operator will not be implemented in the source level program.

In light of the aforesaid disadvantages of currently known programming systems, it is an object of the present invention to provide an apparatus and method for creating and revising programs for numerical controls by producing a generalized data program which is readily understood by a machine operator and by producing in response thereto a machine control program in the form and format required by the specific machine and control combination.

It is a further object of the present invention to provide an apparatus and method for creating and revising numerical control programs wherein a generalized data program is first produced or revised by specifying workpiece features, machine operations, and workpiece material data as are known directly from the workpiece design data.

It is a still further object of the present invention to provide an apparatus and method for creating and revising numerical control programs which produces a generalized data program from data specified in association with graphical representation of workpiece features and machining operations.

It is a still further object of the present invention to provide an apparatus and method for producing a numerical control program by first producing a generalized data program including a material data block, workpiece feature blocks, and machine operation blocks, the various blocks defining data irrespective of specific machine and control limitations.

It is a still further object of the present invention to provide a method and apparatus for converting a generalized data program into a machine control program using predefined cycles relating machine control instructions to workpiece description data, workpiece feature data, operation data, tool data and material data.

Further objects and advantages of the present invention shall be made clear from the attached drawings and the associated description thereof.

SUMMARY OF THE INVENTION

In accordance with the aforesaid objects, an apparatus and method for creating and revising numerical control programs are provided. Workpiece design data are used to produce a generalized data program. The generalized data program is converted to a machine control program by executing predefined cycles relating machine control instructions with the data derived from the generalized data program and files containing machine parameter data, tool data, and process control data. The generalized data program comprises data blocks including a set-up data block, a material block, workpiece feature blocks, and operation blocks. Additional data files are created providing spindle speed, feedrate and coolant data for selected operations in selected materials and tool dimensional data. The generalized data program blocks are so organized as to associate one or more machining operation blocks with workpiece features defined by the data contained in workpiece feature blocks. A single predefined cycle is associated with each block type. The cycles generally comprise instruction sequences to compute data for input to the machine control from the program data and file data. Selected cycles include variable machine control instruction blocks in which data variables are evaluated by the execution of statements within the cycle. The resulting machine control instruction blocks are then assembled into the machine control program. The generalized data program is written in accordance with standards governing parenthetic blocks for numerical controls and can be stored by the machine control for subsequent recall and revision. In the preferred embodiment, means for displaying graphical representations of workpiece features and machining operations are provided and program creation and revision is accomplished by data entry in accordance with the graphical representations displayed.

BRIEF DESCRIPTION OF THE DRAWINGS

FIG. 1 is a block diagram of a first alternative embodiment of the invention showing connection between a programming computer and a plurality of machine controls and other devices.

FIG. 2 is a block diagram of a second alternative embodiment of the invention illustrating integration of the programming computer with a single machine control.

DETAILED DESCRIPTION OF THE PREFERRED EMBODIMENT

Figure 3:
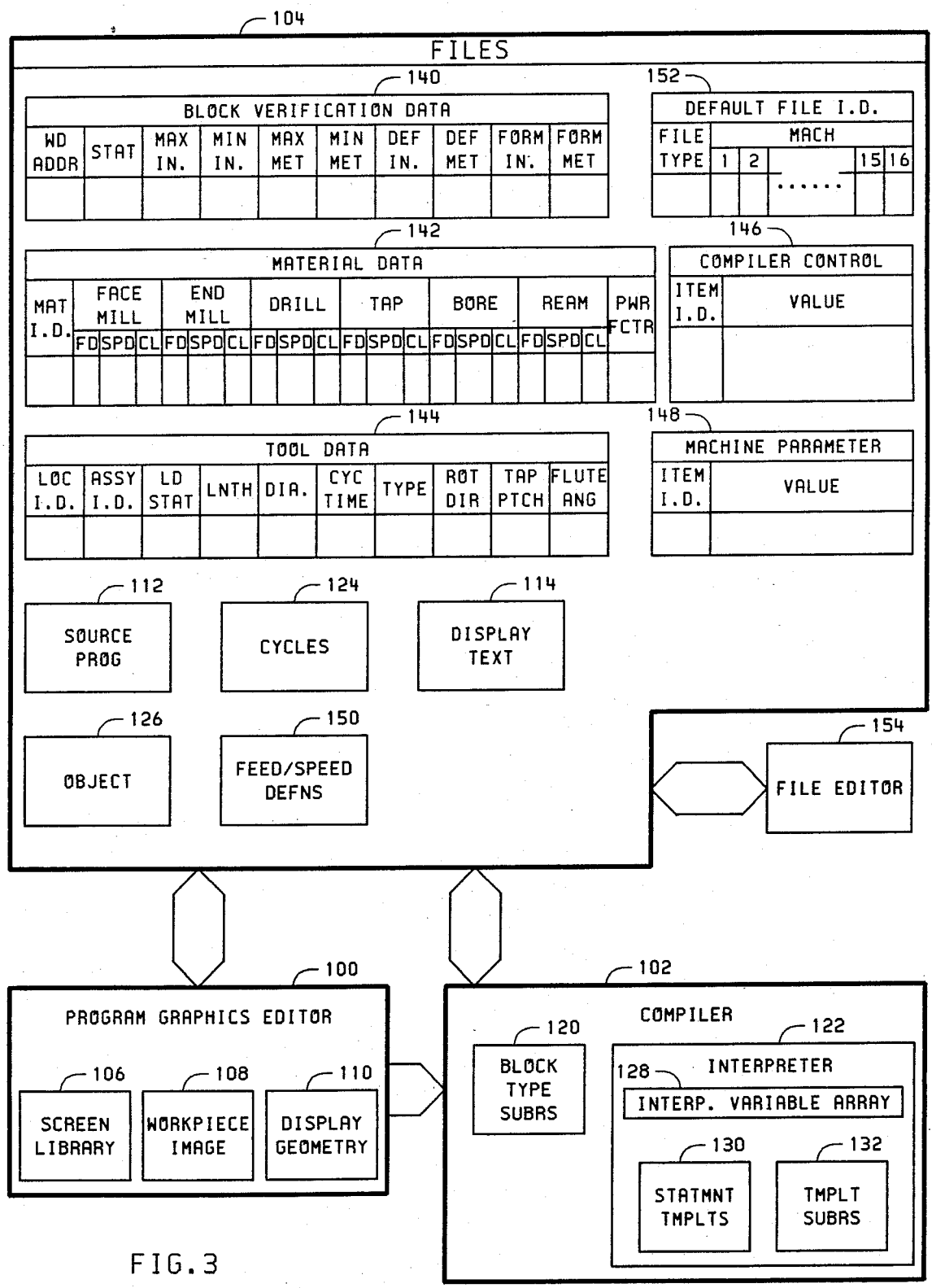
FIG. 3 is a block diagram illustrating principal program modules and files of the present invention.

In order to illustrate the present invention, a preferred embodiment shall be described in detail. The preferred embodiment provides the apparatus and method for creating and revising programs for control of general purpose milling and drilling machines commonly referred to as machining centers. The particular machine control described herein is manufactured by the assignee of the present invention. Program generation and revision is carried out using an IBM PC XT general purpose digital computer manufactured by International Business Machines Corp. Graphic displays are produced on a full color monitor using the Artist TM color graphic control interface available from Control Systems, Inc., of Minneapolis, Mn. The specific choices of computer and numerical control are not to be construed as limitations on the present invention. Further, it will be understood by those skilled in the art that the present invention may be used to create and revise programs for machines other than machining centers and in particular can be readily adapted to create and revise programs for numerically controlled lathes or turning centers.

ENVIRONMENT

It is contemplated that the present invention may be implemented in two distinct versions. A first version, hereinafter referred to as the "off-line" version, provides a single user or operator station for creating and revising programs for a plurality of numerically controlled machines. Generalized data programs are created at the operator station and the resulting machine control instruction programs are transferred to a selected numerical control for storage for future recall and use. The operator station includes means for displaying the information and figures associated with program creation and revision but does not display numerical control input data of a selected machine as the machine instruction program is executed. A second alternative version, hereinafter referred to as the "on-line" version, integrates the means for creating and revising programs with a single numerical control. In the on-line version, a single CRT is used for selectably displaying the normal numerical control display data and the graphic representation displays for program creation and revision.

The hardware configuration of the off-line version of the present invention shall be described with reference to FIG. 1. Machining centers 32 through 38 are shown connected to their numerical controls 16 through 22. The machining centers perform machining operations upon a workpiece by effecting relative motion between machine members to which the workpiece is mounted and machine members carrying a tool. The numerical controls 16 through 22 typically use minicomputers and/or microprocessors to process a numerical control program to control the member motions of machines 32 through 38. Numerical controls 16 through 22 are connected through their respective interfaces 24 through 30 to computer 10 through its interface 12 by the connecting cable 14. The interface 12 and cable 14 also permit connection of other devices such as tape punch 48. Up to 16 different machines may be connected to computer 10 by cable 14. Generalized data program creation and revision are effected at the operator station comprised of computer 10 and peripheral equipment. The computer 10 includes a processing unit and random access memory for program execution. A nonvolatile bulk store such as the fixed disk 46 is used for permanent program and data storage. The computer provides input and output devices for use by an operator including the display 42 such as for example, a color cathode ray tube which is controlled by a graphics controller interface 40. The operator makes alphabetic and numeric entries by keyboard 44. A tape punch 48 is provided for producing hard copies of the machine control program. All computer programs required to create and revise the generalized data program are recorded in the bulk store 46 of computer 10. Generalized data programs are stored on bulk store 46 and machine control instruction programs produced therefrom are transferred to the controls through interface 12 and over cable 14. Unique data for each machine and control combination including machine parameters and tool data are retained at the controls 16 through 22 and transferred through the connecting cable 14 and interfaces to compter 10 as required for processing of the generalized data program to produce a machine control program.

The hardware configuration of the on-line version shall be described with reference to FIG. 2. A general purpose digital computer 50 is connected to the machine control system bus 52 by connecting cable 54 joining communications interface 58 to the computer serial interface 56. As shown in FIG. 2, the numerical control system bus provides a common connection for the control system memory 60, the central processing unit 62, the servomechanism control circuits 64, machine interface circuits 66 and control interface circuits 68. An operator station comprises the color monitor 70, a keyboard 72 and control push buttons 74. The color monitor 70 is controlled by interface controller 76. The keyboard 72 and control push buttons 74 are commonly controlled by the operator station controller 68. To provide selectable display of numerical control data and the program creation and revision displays, interface 76 receives input data through selector 78 which is connected to the graphics controller 80 within computer 50 and to the display interface 82 connected to control system bus 52. Control system memory 60 is used to store tool data signals and machine parameter data signals as well as an active machine control program and the machine control operating system programs. Computer 50 is equipped with a bulk storage device such as disk store 84. All programs required for creation and revision of generalized data programs are stored in bulk store 84. Further, generalized data programs and inactive machine control programs are retained on bulk store 84. As the program creation and revision system is integrated with the numerical control, no provision is made for selecting from a plurality of machine and control combinations or directing transfer of data to or from a plurality of machine and control combinations. Machine parameter data signals and tool data signals are transferred to computer 50 from bus 52 through communication interface 58 and over cable 54. Machine control instruction block signals of a selected machine control program are transferred from bulk store 84 to memory 60 over cable 54 and through interface 58. One further contrast between the on-line and the off-line versions is in the display device. A single color monitor 70 in the on-line version is shared to display numerical control data and the graphic representations associated with creation and revision of the generalized data programs. The off-line version does not display numerical control data normally presented at the machine controls. Rather, a separate display device is provided for the program creation and revision station.

SYSTEM COMPONENTS

The present invention provides for the creation and revision of numerical control programs in two distinct stages. The first stage produces a generalized data program consisting of program blocks as described in Table 1. The generalized data program is subsequently processed to produce the machine control program comprising machine control instruction blocks as described in Table 2. The system components used to produce and process the generalized data program shall be described generally with reference to the block diagram of FIG. 3.

The generalized data program creation and revision is carried out under the control of a graphics editor program 100. Processing of the generalized data program to produce a machine control program is performed in accordance with a compiler program 102. Data which is required to produce the machine control program but which is not supplied by the generalized data program is obtained from the system files 104.

The graphics editor program 100 responds to operator inputs to effect execution of a display screen subroutine selected from the display screen library 106. A selected display screen subroutine provides the data input to the graphics controller to produce the desired image on the operator's station display device. To assist the operator's understanding of the description of the workpiece as the generalized data program is being created or revised, a current graphical representation of the workpiece is displayed. The data for creating this workpiece display are stored in a workpiece image buffer 108. As the workpiece feature elements are combined, blend points between linear and circular segments are calculated using an algorithm selected from a display geometry subroutine library 110. Block type word signals and data word signals for each block of the generalized data program are produced in response to operator data entry associated with a single selected display. In this fashion, a complete generalized data block can be created or revised while a single display screen is presented to the operator on the display device. The graphics editor program 100 defines the sequence in which screen displays are presented. This in turn, defines a sequence in which blocks of the generalized data program are produced. The block type word and data word signals are stored in the source program file space 112 in the order in which they are produced. All text to be displayed on the system display device is stored in the display text file 114. A display screen subroutine selected from the screen library 106 retrieves the required textual display signals from the display text file 114 and passes these data signals to the display controller.

The compiler 102 verifies the generalized data program blocks for completeness and data value ranges and effects the execution of cycles from the cycle file 124 to produce the machine control instruction block signals which are stored in the object file 126. Cycle execution is controlled by an interpreter program 122.

The cycle routines stored in cycle file 124 include a mixture of cycle statement signals and variable machine control instruction block signals. The cycle statement signals represent cycle words as described in Table 3. Cycle statements are used to evaluate variables to produce values for output in the machine instruction blocks. The cycle variable value signals are stored in the interpreter variable array 128. Cycle statements must conform to a limited number of predefined forms. Execution of cycle statements is carried out by the interpreter 122 using interpreter template subroutines 132. Selection of the appropriate interpreter template subroutine is accomplished by iterative comparison of a cycle statement against a selected statement template from the collection of statement templates 130.

As hereinbefore stated, the compiler verifies data contained in the generalized data program blocks. As each generalized data program block is read by the compiler, the block data word signals are compared against verification data signals retrieved from the block verification data file 140. In this manner the compiler is able to determine whether or not required words are present, whether or not data values are within predefined limits, and provide default values for data words which are not required and are not programmed. The verification data file includes maximum, minimum and default values for both inch and metric dimensions.

Following verification of all blocks of the generalized data program, the compiler proceeds to call for the execution of block type subroutines 120. The block type subroutines effect the completion of block data either by calculation according to predefined algorithms relating programmed data or by retrieval from the appropriate files. For example, the material data file 142 which relates machining operations, material types and feed rate, spindle speed, and coolant control data, can be used by the compiler to supply feed rate, spindle speed, or coolant control data which was not specified in a generalized data block. In a similar fashion the tool data file 144 provides tool specification including the tool assembly identification, the tool loading and unloading status, the tool length and diameter, the tool cycle time limit, tool type, required direction of rotation, tap pitch, and flute angle. By comparing specified data from generalized data program blocks against the data in the tool data file 144, the compiler 102 may select a tool location and/or tool assembly for a tool resident at the machine that meets the requirements specified in the program block.

Likewise, the compiler program 102 can effect completion of generalized data blocks by reference to the compiler control file 146, the machine parameter file 148, or the feed and speed definition file 150. The machine parameter file 148 provides data describing machine axis limits, spindle speed limits, available coolant control and other machine parameter data unique to a specified machine. The compiler control file 146 includes default and decision data used by the compiler 102 to control execution of compiler routines. The compiler provides for specification of feed rate in a plurality of dimensional definitions including inch and metric units per unit time, per unit spindle revolution or per unit tool cutting edge. Spindle speeds may be specified dimensionally as revolutions per unit time or surface feet per unit time. The compiler 102 refers to the feed rate and spindle speed definitions given in the definition file 150 to assign the proper dimensional definition to program data.

To permit creation and revision of control programs for a plurality of machines, the compiler has access to a machine default file 152 which identifies a file number for each of the file types including files 112, 114, 124, 126, 142, 144, 146, 148 and 150 to be assigned to each of the machines connected to the programming station in the off-line version. File data is derived from different sources depending on the file type. Since each machine will generally exhibit some distinguishing characteristics differentiating it from other machines of the same type, the capacity for associating cycles with selected machines provides the required ability to produce different machine control instruction blocks from the same generalized data block. The machine default file 152 provides the means for selecting a set of cycles for a selected machine from a plurality of sets of cycles.

Both the tool data file 144 and the machine parameter file 148 can be automatically loaded to the computer 10 from a selected numerical control. The source file 112 and object file 126 are loaded by execution of the graphics editor program 100 and the compiler program 102, respectively. The material data file 142, the display text file 114, the cycle file 124, the feed and speed definition file 150 and the machine default file 152 may all be filled by signals produced by manual data entry through the operator station by means of a file editor program 154.

EDITOR

The graphics editor is the preferred device for creating and revising generalized data programs. Nevertheless, such programs may be created without use of a graphic display station provided that the generalized data blocks conform to the definitions set forth in Table 1 below.

TABLE 1

| | Generalized Data Block | | |
|---|---|---|---|
| Block Type | Block Format | Req. Words | Address Definitions |
| Comment | N(COM,I) | I | I precedes alphanumeric text |
| Material | N(MAT,X, Y, U,V,I) | All | X,Y = coordinates of lower left hand corner of workpiece blank<br>U,V = coordinates of upper right hand corner of workpiece blank<br>I = material type |
| Setup | N(SET,G, X,Y,Z,U, V,W,S,P, I,J,K,L, Q,R,H,F, O) | G | X,Y,Z = maximum limits for travel in each axis<br>U,V,W = minimum travel along each axis<br>S = maximum spindle speed selected by user<br>P = maximum spindle power selected by user<br>I,J,K = X,Y,Z coordinates of a tool change location<br>L,Q,R = X,Y,Z coordinates of a tool location for table indexing<br>F = a "less than rapid" approach feed rate<br>H = a Z axis clearance dimension defining the beginning of feed rate motion<br>O = an X and Y clearance dimension defining the beginning of feed motion |
| Clamp | N(CLA,Q, X,Y,Z,H, R) | All | Q = a selected predefined clamp position (1-9)<br>X,Y,Z = coordinates of the point on the workpiece blank where the clamp is attached<br>H = the height of the clamp<br>R = a radius centered on the X,Y,Z coordinate location |
| Wsurface | N(WSU,Z B,R) | Z | Z = Z axis coordinate of the primary workpiece surface<br>B = the index table angle relative to its O position<br>R = the Z axis distance above the work surface for clearance or retract at which the tool tip moves at rapid rate |
| End | N(end) | | Last block of the generalized data program |
| Pocket | N(POC,P, E,X,Y,U, V,A,D,R, B) | X,Y and U, V or D | X,Y = (rectangular pocket) axis coordinates of lower left hand corner of rectangle (circular pocket) axis coordinates of the circle center; (free-form pocket) coordinates of start point of first geometry element of contour<br>U,V = X axis and Y axis dimensions of rectangular pocket respectively<br>D = diameter of circular pocket<br>A = clockwise rotation of rectangular pocket with respect to X axis<br>R = radius for all four corners of rectangular pocket<br>B = width of 45 degree break at all corners of rectangular pocket<br>P = amount of excess stock to be left on inside of pocket<br>E = maximum amount of rough stock on inside of |

TABLE 1-continued

Generalized Data Block

| Block Type | Block Format | Req. Words | Address Definitions |
|---|---|---|---|
| Frame | N(FRA,P, E,X,Y,U, ·V,A, D,R,B) | X,Y and U,V or D | pocket<br>X,Y = (rectangular frame) axis coordinates of lower left hand corner of rectangle; or, (circular frame) axis coordinates of circle center; or, (free form frame) start point of first geometry element of contour<br>U,V = X and Y dimensions of rectangular frame respectively<br>D = diameter of circular frame<br>A = clockwise rotation of rectangular frame with respect to the X axis<br>R = radius to be placed at all corners of rectangular frame<br>B = width of break to be placed at all corners of rectangular frame<br>P = amount of excess stock to left on outside of frame<br>E = maximum amount of rough stock present on outside of frame |
| Path | N(Pat,P, E,Q,X,Y) | E,Q, X,Y | P = amount of finish stock to be left for a finish cut<br>E = maximum amount of rough stock present along the boundary of the path<br>Q = whether the machining is to take place on the left, right or center of the boundary path<br>X,Y = coordinates of the starting point of the path |
| Face | N(FAC,X, Y,U,V,A, D,P) | X,Y and U, V or D | X,Y = (rectangular face) the axis coordinates of the lower left hand corner of the rectangle covering the face; or<br>= (circular face) axis coordinates of the center of the circle covering the face; or<br>= (free form face) axis coordinates of the start point of the first geometry element of the contour<br>U,V = the dimensions along the X and Y axes respectively of the rectangular face<br>A = the clockwise rotation of the rectangular face with respect to the X axis<br>P = the amount of finish stock to be left by roughing operation |
| Phole | N(PHO,X, Y,U,V,L, A,Q) | (1)X,Y, (2)U,V (3)X,A or Y,A, (4)U,A or V,A (5)X,U or Y,V or (6)L,A | X,Y = absolute coordinates of the hole center<br>U,V = incremental coordinates to the hole center from the previously defined location<br>L = the linear distance between the hole center and the previously defined location<br>A = the angle between the X axis and a line passing through the hole center and the previously defined location |
| Lhole | N(LHO,X, Y,U,V,P, L,A,N) | X,Y and (1)L,A,N (2)L,A,P (3)U,V,N (4)U,V,P (5)U,A,N or V,A,N (6)U,A,P or V,A,P | Q = which of the following machining operation blocks are to be skipped at the defined hole<br>X,Y = absolute coordinates of first hole on the linear pattern<br>U,V = incremental coordinate between each hole on the linear pattern<br>P = incremental distance between each hole on the linear pattern<br>L = linear distance between the first and last hole on the linear pattern<br>A = the angle between the linear pattern and the X axis<br>N = the number of holes on the linear pattern |
| Chole | N(CHO,X, Y,D,G,A, P,N) | X,Y,D,G, A,N for a complete circle and X,Y,D,G,A, N,P for a partial circle | X,Y = absolute coordinates of the center point of the circular pattern<br>D = the diameter of the circular pattern<br>G = a clockwise or counter clockwise hole pattern<br>A = the angle with respect to the X axis of a line Passing through the center of the circular pattern and the first hole<br>P = the incremental angle between each hole and the circular pattern.<br>N = the number of holes |
| Ghole grid hole pattern | N(GHO,X, Y,U,V,A, B,N.M) | X,Y,U, V,N,M | X,Y, = absolute coordinates of the center of the bottom left hand hole in the grid pattern<br>U,V = horizontal and vertical increments between holes in the grid pattern<br>A = the angle between the X axis and the horizontal grid lines<br>B = the angle between the Y axis and the vertical grid lines N<br>N,M = the number of holes on the horizontal and vertical lines respectively |
| Bhole box hole pattern | N(BO,X, Y,U,V,A, B,N,M) | X,Y,U, Y,U,V,- A, B,N,M) | X,Y = absolute coordinates of the center of the bottom left hand hole in the box pattern<br>U,V = the horizontal and vertical increments between holes in the box pattern<br>A = the angle between the X axis and the horizontal box lines<br>B = the angle between the Y axis and the vertical box lines<br>N,M = the number of holes on the horizontal and vertical box lines respectively |
| Line | N(LIN,X, | (1)X,Y, | Y = the absolute coordinates |

TABLE 1-continued

| Block Type | Block Format | Req. Words | Address Definitions |
|---|---|---|---|
| line segment for free form | Y,U,V,L, A,W,Q) | (2)L,A (3)U,V, (4)X,A or Y,A (5)U,A or V,A (6)X,V or Y,U | of the end point of line segment V=the incremental coordinates of the line segment from start point L=the linear distance between the start and end point A=the angle the line segment and the X axis W=indicates whether the line segment is connected to another line or tangent to the next arc =(associated with face block only) selects whether or not the tool may cross over the line segment during machining |
| Circle arc for free form shape | N(CIR,G, X,Y,U,V, I,J,R,A, W,Q) | G and (1)X,Y,I J (2)X,Y,R (3)U,V,I J (4)U,V,R (5)I,J,R A (6)I,J,R, X or I,J,R, Y | G=clockwise or counterclockwise direction along the arc to the end point X Y= the absolute coordinates of the end point of the arc except for the first free form element in which case they are the absolute coordinates of the start point of the arc U V=the end point incremental coordinates from the start point I J=the absolute coordinates of the circle center R=the radius of the circle A=the angle from the radius to the start point to the radius through the end point W=the selection whether the arc is tangent to the annexed arc line Q=(face only) selection whether the tool passes over the circular segment during machining |
| Bbore back boring operation | N(BBO,Z, D,H,T,S, F,C,P,W, N,R,L,G, E) | H,D,L and Z | Z=hole depth from the top of the back bore hole D=diameter of the hole H=Z distance from the work surface to the top of the back bore hole L=rapid through clearance distance past the bottom of the back bore hole T=the tool code S=the spindle speed F=feed rate D=dwell amount at programmed depth C=coolant control W=rotation control during retract N=number of teeth on the tool R=rotation direction control G=gage height E=the less than rapid approach feed rate value |
| Bore boring operation | N(BOR,Z, D,H,E,S, F,C,P,W, N,G,E) | H and D | Z=hole depth from top bore hole to the bottom D=diameter of the hole to be bored H=Z distance from work surface to the top of the bore hole T=the tool code S=the spindle speed F=the feed rate C=coolant control D=dwell at programmed depth W=rotation control during tool retract N=number of teeth on tool G=gage height E=the less than rapid approach feed rate value |
| Cobore counter- bore operation | N(COB,Z, D,H,T,S, F,C,P,N, L,G,E) | H and D | Z=hole depth from the top of the counterbore hole to the bottom D=diameter of the hole to be counterbored L=pilot length of the counter boring tool H=Z distance from the work surface of the top of the counterbore hole T=the tool code S=spindle speed F=feed rate C=coolant control P=dwell at programmed depth N=number of teeth on a tool G=gage height E=the less than rapid approach feed rate |
| Spot center drill or counter- sinking operation | N(SPO,Q, Z,D,H,T, S,F,C,P, A,G,E) | Q,and H or D | Q=selection of center drill or countersinking operation Z=hole depth from the top of the hole to the bottom D=diameter of the hole H=the Z distance from the work surface to the top of the hole T=the tool code S=the spindle speed F=the feed rate C=coolant control D=the dwell at program depth A=the tool angle G=gage height E=the less than rapid approach feed rate |
| Drill drilling operation | N(DRI,Q, K,Z,D,H, T,S,F,C, P,A,I,G, E) | Q,K,H and D | Q=sel. of normal or peck drilling K=type of peck drilling Z=hole depth from top of the hole to the bottom D=diameter of the holed Z=Z distance from the work surface to the top of the hole T=the tool code S=the spindle speed F=the feed rate C=the coolant control D=the dwell at program depth A=the tool angle I=the maximum peck drill depth G=the gage height E=the less than rapid approach feed rate |
| Tap tapping operation | N(TAP,L, K,Z,D,H, T,S,C,P, G,E) | L or K D and H | L=lead of the tap K=pitch and threads per inch Z=hole depth from the top of the hole to the bottom D=diameter of the hole |

TABLE 1-continued

| Block Type | Block Format | Req. Words | Address Definitions |
|---|---|---|---|
| | | | A=the Z distance from the work surface to the top of the hole<br>T=the tool code<br>S=spindle speed<br>C=coolant control<br>R=the control of dir. of rotation<br>G=gage height E=the less than rapid approach feed rate |
| Emill end milling operation (two axis) | N(EMI,Z, D,Q,H,T, S,F,C,N, A,I,M,R, G,E) | D and Z | Q=selection of conventional or climb milling for finish pass<br>H=depth the tool must machine<br>D=diameter of the tool<br>Z=the distance from the work surface to the plane on which milling is to be done<br>T=the tool code<br>S=the spindle speed<br>F=the feed rate<br>C=coolant control<br>N=the number of teeth on the tool<br>A=the angle for a tapered mill cutter<br>I=the maximum increment depth the tool can advance during multistep pocketing<br>M=the maximum thickness the tool is allowed to machine<br>R=the radial depth of cut<br>G=the gage height<br>E=the less than rapid approach feed rate |
| Plunge 3 axis milling | N(PLU,Q, Z,D,H,T, S,F,C,N, A,I,M,R, G,E) | D | Q=selection of conventional or climb milling for the finish pass<br>Z sets the depth the tool must machine<br>D=diameter of the tool<br>H=Z distance from the work surface to the plane on which milling is to be done<br>T=the tool code<br>S=spindle speed<br>F=feed rate<br>C=coolant control<br>N=the number of teeth on the tool<br>A=the angle for a tapered mill cutter<br>I=maximum depth the tool can advance in multistep pocketing<br>M=the maximum thickness the tool is allowed to machine<br>R=the radial depth of cut<br>G=gage height<br>E=the less than rapid approach feed rate |
| Fmill face milling | N(FMI,D, Q,Z,T,S, C,N,A,I, M,R,G,E, U) | D,Z | Q=the selection of conventional or climb milling for the finish pass<br>D=diameter of the tool<br>Z=the Z distance from the work surface to the plane on which milling is to be done<br>T=the tool code<br>S=the spindle speed<br>F=the feed rate<br>C=coolant control<br>N=the number of teeth on a tool<br>A=the angle for a tapered mill cutter<br>I=the maximum depth the tool can advance in multistep pocketing<br>M=the maximum thickness the tool is allowed to machine<br>R=the radial depth of cut<br>G=gage height<br>E=the less than rapid approach feed rate and<br>U=the maximum amount of rough stock present on any portion of the face |
| Edge edge finishing operation | N(EDG,Q, H,D,Z,T, S,F,C,A, N,G,E) | D and Z | Q=selection of conventional or climb milling for finish pass<br>H=size of the chamfer to be machined<br>D=largest diameter of the tool<br>Z=the Z distance from the work surface to the plane on which milling is to be done<br>T=the tool code<br>S=the spindle speed<br>F=the feed rate<br>C=coolant control<br>A=the angle for a tapered edge cutter<br>N=the number of teeth on the tool<br>G=gage height<br>E=the less than rapid approach feed rate |

As illustrated by the Block Format information in Table 1, each word of a generalized data block with the exception of the block type is identified by a single letter address. The address N designates a sequence number and is automatically supplied by the editor program 100. The remaining alphanumeric words of the generalized data block are set forth within the opening and closing parenthesis. Parenthetic block programming is recognized under EIA RS274-D and classified as Type II blocks. The numeric data format for the generalized data block words has not been set forth in Table 1 in the interest of clarity. It will be appreciated by those skilled in the art that each word except the three alphabetic character block type word, begins with its alphabetic address and is followed by one or more numeric characters. The alphabetic address selection and the numeric character selection are a matter of design choice. The editor program 100, compiler program 102 and interpretor program 122 all conform to a selected definition of the significance of numeric data for each word of each block type.

The required words of the generalized data program blocks are readily supplied from the workpiece design data as may be presented on a workpiece drawing. Additional data which is necessary for producing the machine control program is readily supplied from known tool data or from machining handbooks. The program structure using the generalized data program blocks requires that a material selection be specified first then setup data and then a workpiece feature and the associated machining operations for that feature. The graphics editor program 100 imposes this sequence on the user during program creation.

Figure 4A:
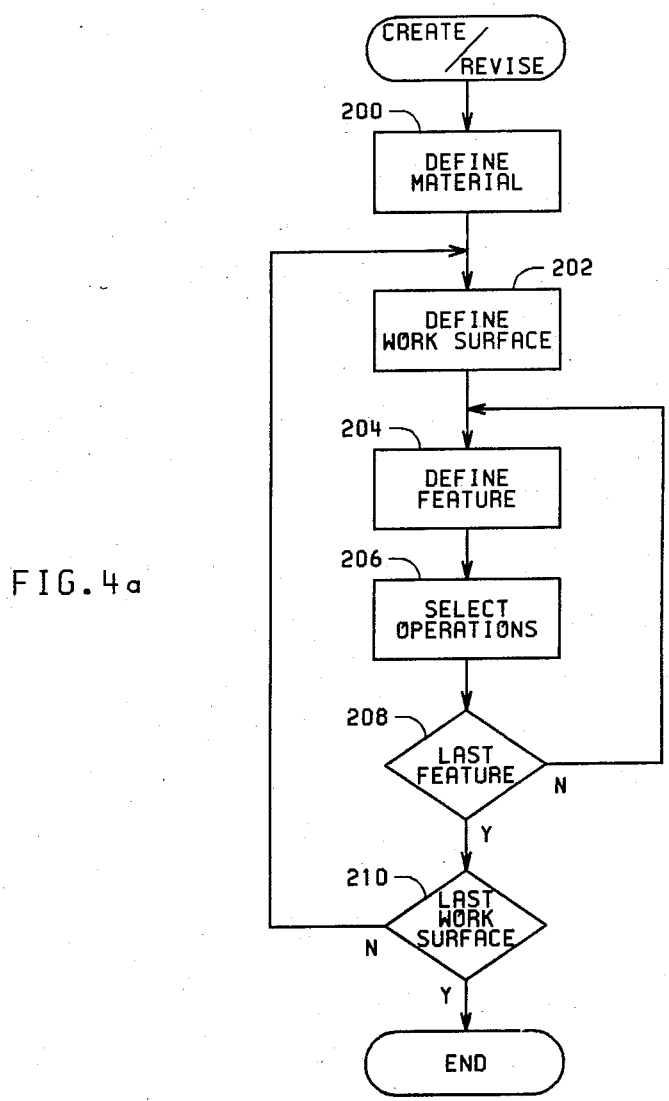
FIG. 4a is a flow chart of a procedure for creating or revising generalized data programs in accordance with the present invention.

An overall flow chart describing the procedure for creating or revising a generalized data program shall be described with reference to FIG. 4a. At step 200 the workpiece material is defined. This may be accomplished by identifying the material type and grade. Material specification will result in the creation or revision of a single MATerial block. At procedure step 202, a work surface is defined by the dimension in the Z axis to the desired work surface. At procedure step 204, a workpiece feature is defined either by specifying data for a predefined feature type such as a frame, pocket or hole pattern or by programming a series of blocks defining a free-form feature. When the feature definition is complete, machining operations are selected at procedure step 206. The machining operations comprise all of the operations required to complete a particular feature. At decision step 208, it is determined whether or not the feature for which machining operations have been defined is the last feature of the workpiece program. If not, procedure steps 204 and 206 are repeated until a complete definition of all of the features and the associated machining operations has been completed. After completing the definition of the features, decision step 210 determines whether or not the current work surface is the last work surface for the workpiece program and if not, a new work surface is defined by the path from the NO side of decision step 210 to procedure step 202. From step 202, programming continues through the procedure steps 204 and 206 and decision step 208 for definition of all the features of the last defined work surface. When all the work surfaces and features have been defined, the program task is complete and the last block type indicating end of program is added as indicated at terminal 212.

Figure 4B:
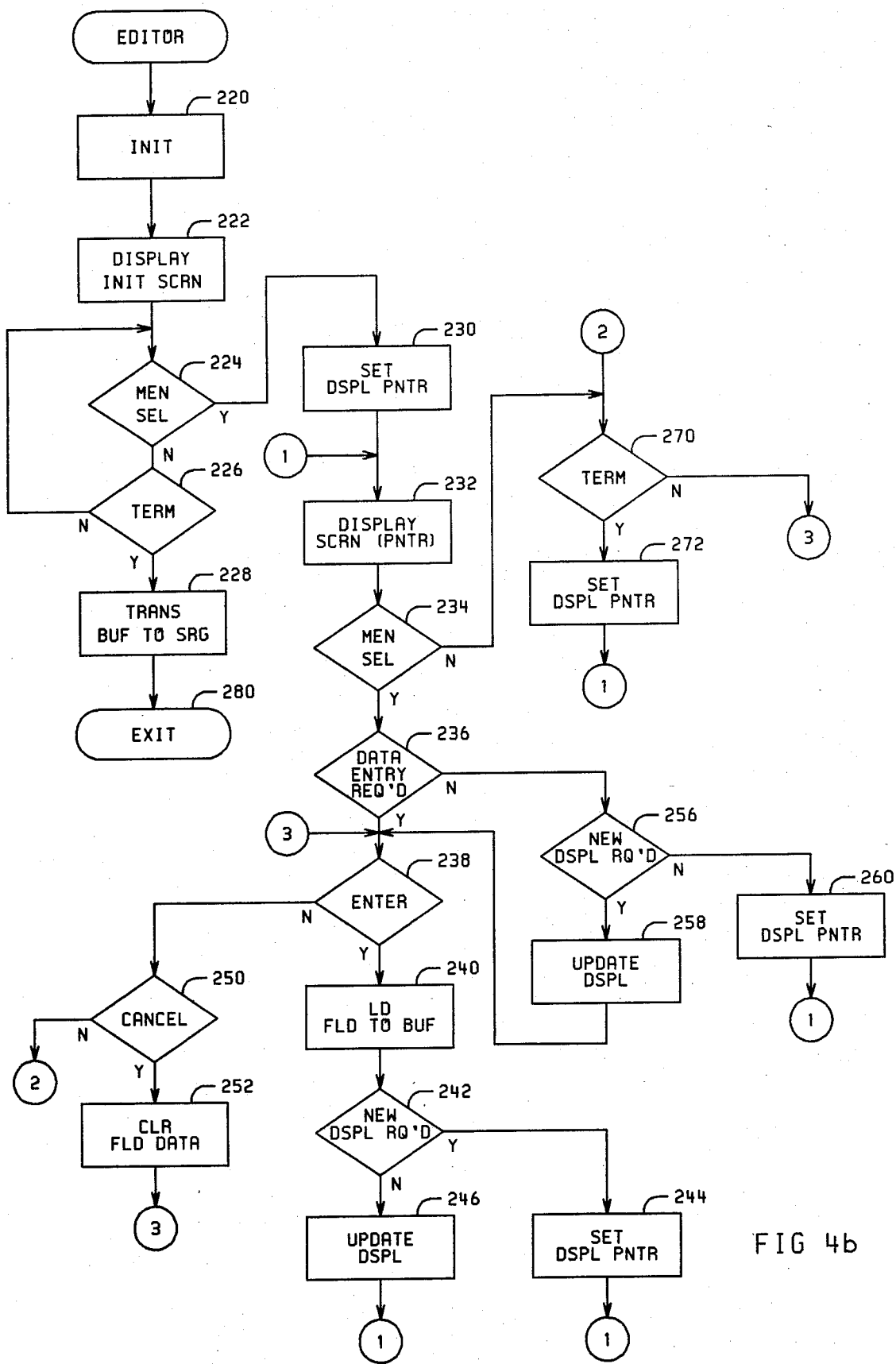
FIG. 4b is a flow chart of operation to create or revise a generalized data program using displays of graphic representations of workpiece features and machining operations.

The operation of the graphics editor program shall be described with reference to the flow chart of FIG. 4b. At process step 220 variable data and program execution control flags are initialized. At process step 222 the subroutine for controlling display of an initial display screen (predetermined display format) is recalled from the screen library 106. At decision step 224 it is determined whether or not the operator has made a menu selection. In general, menu selections identify a particular field in the display for data entry or a block type requiring display of a different display screen. It is convenient to consider each display screen as defining a state of the operator's station. While the station is in a particular state data entry is performed by the operator to produce data for the associated generalized data program block. Once the operator has finished with all data entries desired for the current display, a new display and associated state are selected by terminating the current state or by menu selection.

If during display of the initial screen no menu selection has been made, decision step 266 determines whether or not a terminate input has been produced. If not the editor idles while waiting for the selection of a menu item or the termination of the current system state. If the terminate input signal is recognized, execution of the editor program proceeds to process step 228 where the source program being created or revised by the editor is transferred to the source program file 112. Thereafter, the editor function is exited by terminal 280.

If at decision step 224 it had been determined that a menu selection had been made, execution proceeds to process step 230 where the display pointer for recalling a selected subroutine from the screen library 106 is set to the appropriate value indicated by the menu selection. At process step 232, the display screen indicated by the pointer is displayed. At decision step 234, it is determined whether or not a menu selection has been made from the currently displayed screen. If a menu selection has been made, decision step 236 determines whether or not data entry is required for the item selected.

If data entry is required, editor program execution proceeds to decision step 238 where it is determined whether or not the enter input has been received. The operator's data entry may be loaded to the selected source program buffer by activation of the enter input. Alternatively, the operator may choose to cancel a data entry and retry. If the enter input has not been received, editor program execution proceeds to decision step 250 where it is determined whether or not the cancel input has been received. If the cancel input is received, execution proceeds at process step 252 where the data entered is cleared from the selected field and thereafter editor program execution continues through the on page connector 3 to process step 238.

If the cancel input is not received, a test is made at decision step 270 to determine whether or not the terminate input has been received. Termination of the present state of the operator station advances editor program execution to process step 272 where the display screen pointer is set to the appropriate value to return to the preceding system state. Thereafter, execution of the editor program continues through the on page connector 1 to process step 232 where the display screen identified by the pointer is displayed. If at decision step 234 it is determined that no menu selection is made, execution continues at decision step 270 to determine whether or not the terminate input has been received. If following decision steps 238, 250 and 270 it is determined that data entry has not been completed or cancelled and the current operator station state has not been terminated, execution proceeds through the sequence of steps beginning with decision step 238 until the enter, cancel or terminate input is received.

In some instances, following a menu selection, an alternative display screen may be required. Thus, at decision step 236 if no data entry is required, execution of the editor program proceeds to decision step 256 where it is determined whether or not a new display screen is required. If so, the display screen pointer is set to the appropriate value at process step 260 and thereafter execution continues through process step 232 to display a new display screen. If it is determined at decision step 256 that a new display screen is not required, and keeping in mind that data entry is not required, the appropriate response is to update the display to highlight a field identified by the menu selection. This updating is accomplished at process step 258. Thereafter, execution would continue at decision step 238 awaiting entry of data for the newly highlighted field.

Upon receipt of the enter input signal, as determined by decision step 238, execution of the editor program proceeds to process step 240 where the entered data is loaded from the display field to the word in the editor buffer. At decision step 242 it is determined whether or not a new display is required in response to data having been entered. If not, the display will require updating and this is accomplished at process step 246. Where data is entered defining features, the result may affect the workpiece image 108 and may require execution of a mathematical algorithm to complete the definition of the displayed geometry using a subroutine from the geometry display subroutines 110. Thereafter, editor program execution proceeds through the on page connector to process step 232. If it is determined at decision step 242 that a new display is required, the display pointer is set to the appropriate value at process step 244 and execution of the editor program proceeds through the on page connector to process step 232.

In general the editor program provides for the selection of items by the operator through a displayed menu and the entry of numeric data for a selected data field. The operator advances through the programming procedure described with reference to FIG. 4a as permitted by the editor program primarily by menu selection. That is, the editor program controls the order in which different display types and, hence, block types can be accessed. Completion of the programming function is indicated by producing the terminate signal input while the initial display screen is displayed. Program blocks existing in the editor buffer prior to the receipt of the terminate input during display of the initial screen are transferred from the editor buffer to the source file 112.

An existing generalized data program may be revised using the procedure of FIG. 4b and executing the graphics editor program 100 as described with reference to FIG. 4b by first specifying the identification of the program to be revised. The identified program is recalled from bulk memory and loaded to the editor buffer. The initial display screen is presented and revision of the program proceeds with the desired menu selections and data entry.

During the creation or revision of a generalized data program the graphics editor program displays the features defined with respect to the selected workpiece surface. A satisfactory display of the relevant workpiece geometry is thus effected in two dimensions. As feature block types are selected, the display provides insets depicting the particular feature type. Free-form geometry is constructed in the order in which the geometry elements are specified by the operator. Displays associated with selected machine operations include a two dimensional representation of the tool and its relation to the workpiece surface and an isometric representation of the geometry which the tool is intended to produce.

COMPILER

A generalized data program is converted to a machine control program by execution of the compiler program 102. The machine control program will in general conform to the EIA standard RS 274. This standard permits relatively wide latitude with respect to the type 1 block definitions and the resulting machining functions. An abbreviated description of the type 1 program blocks is set forth below in Table 2.

TABLE 2
EIA RS274-D
Word Definitions

| Address | Descriptions |
|---|---|
| A | Rotational dimension about X Axis |
| B | Rotational dimension about Y Axis |
| C | Rotational dimension about Z Axis |
| D | Rotational dimension about special axis or third feed function or tool function |

TABLE 2-continued
EIA RS274-D
Word Definitions

| Address | Descriptions |
|---|---|
|  | for selection of tool compensation |
| E | Rotation about special axis or second feed function |
| F | Feed function |
| G | Preparatory function (00-06, 08-9,13-16, 33-35,40-44,70-75, & 80-97 are defined) |
| H | Unassigned |
| I | Interpolation parameter or thread lead parallel to X |
| J | Interpolation parameter or thread lead parallel to Y |
| K | Interpolation parameter or thread lead parallel to Z |
| L | Unassigned |
| M | Miscellaneous function (00-16,19,30-31, 40-49,58-59 & 90-99 are defined) |
| N | Sequence number |
| O | Sequence number for secondary head only |
| P | Third rapid traverse dimension or tertiary motion dimension parallal to X |
| Q | Second rapid traverse dimension or tertiary motion dimension parallel to Y |
| R | First rapid traverse dimension or tertiary motion dimension parallel to Z or radius for constant surface speed calculation |
| S | Spindle speed function |
| T | Tool function |
| U | Secondary motion dimension parallel to X |
| V | Secondary motion dimension parallel to Y |
| W | Secondary motion dimension parallel to Z |
| X | Primary X motion dimension |
| Y | Primary Y motion dimension |
| Z | Primary Z motion dimension |

Numeric data format for each word of Table 2 is defined by the designer of the numeric control. In general, motion dimensions are programmed with a sign, plus or minus, to indicate the direction of travel. Decimal point programming is permitted but not required. Dimension data directly specifies machine axis motion. Preparatory functions in the range of 81-89 identify "fixed cycles" defined by the control designer. A fixed cycle typically causes the control to respond to the data input with a predefined sequence of motions to perform a machining operation. Other preparatory functions are used to select types of interpolation, interpolation planes, cutter compensation and inch or metric program input. Miscellaneous functions effect selection of spindle rotation direction, coolant control, tool changes and gear changes. And, as in the case of preparatory functions, the control designer determines the specific machine response to a programmed function code.

From Table 2 it is apparent that the machine control instruction blocks specify machine member motion relative to the machine control program coordinate system. The specific tool motion to result from the generalized data program blocks is a function of the preference of the machine tool builder and the feature geometry and therefore is determined by the design of the cycles 124. It is the function of the compiler to use the data definitions of the generalized data program blocks to provide data required for the execution of the cycles 124 to produce the machine control blocks conforming to the description of Table 2.

Operation of the compiler will be described with reference to the flow chart of FIG. 5. Beginning at process step 300, variable values and execution control flags are initialized. At process step 302, the file storage spaces are loaded with data recalled either from the bulk store or from the machine control. At process step 304, a generalized data program block is read by the compiler program 102. Process step 306 executes a verification subroutine to compare each word of the generalized data program block read at process step 304 against the appropriate block verification data from the block verification file 140. At decision step 308 it is determined whether or not the programmed block data is within the limits specified by the verification data and all required data words of the block type are present. If not, an error signal is output at process step 310 and execution of the compiler program is terminated at the terminal 311.

Provided that decision step 308 determined that the programmed data of the block was satisfactory, execution of the compiler program proceeds at process step 312 where the generalized data block is transferred from a temporary buffer used by the compiler to permit input of the next generalized data program block. If the verified block was an END block as determined by decision step 314, all blocks of the selected generalized data program would have been read and verified and execution of the compiler program can proceed at process step 316. Until decision 314 determines that a verified block is an END block, execution of process steps 304 through 312 is repeated as indicated by the loop from the NO side of decision step 314.

Assuming the program input and verification phase of the compiler is successfully completed, the next processing function is initiated by setting a block pointer to the first block of the generalized data program at process step 316. At process step 318 a block type subroutine is called the complete the block data. The block type subroutine may be required to supply data from the material data file 142 or the tool data file 144 in place of omitted words in the program block. For example, the operator need not specify feed rates and spindle speeds for the selected machine operations provided the identified material is one for which material data signals exist in the material data file. Thus, the subroutine called at process step 318 would provide the missing information based on the selected machining operation and the identified workpiece material. Alternatively, the block type subroutine may be required to produce coordinate values for use by the interpreter using one of the alternative input specifications for locations. For example, the grid hole pattern block permits specification of the location of holes in terms of incremental spaces from the first hole. The block type subroutine would then use the data available in the generalized data program block to produce the rectangular coordinates of all of the holes in the grid pattern.

Upon completion of execution of the block type subroutine, data is loaded into the variable array 128 by process step 320. Thereafter, the cycle code from cycle store 124 is loaded from the bulk store to the active computer memory for execution under control of the interpreter. At process step 324, the interpreter subroutine is called to effect execution of the cycle code loaded in process step 322. Upon completion of execution of the cycle code, execution of the compiler program resumes at decision step 326 where it is determined whether or not the last generalized data program block processed was the END block. If not, the block pointer is incremented to the next block in the generalized data program at process step 328 and execution of the compiler program continues through on page connector 2 to process step 318. If it is determined at decision step 326 that the last generalized data program block processed is the END block, the resultant machine control blocks are transferred to the object file 126. Thereafter, execution of the compiler program is exited at terminal 332.

Figure 6:
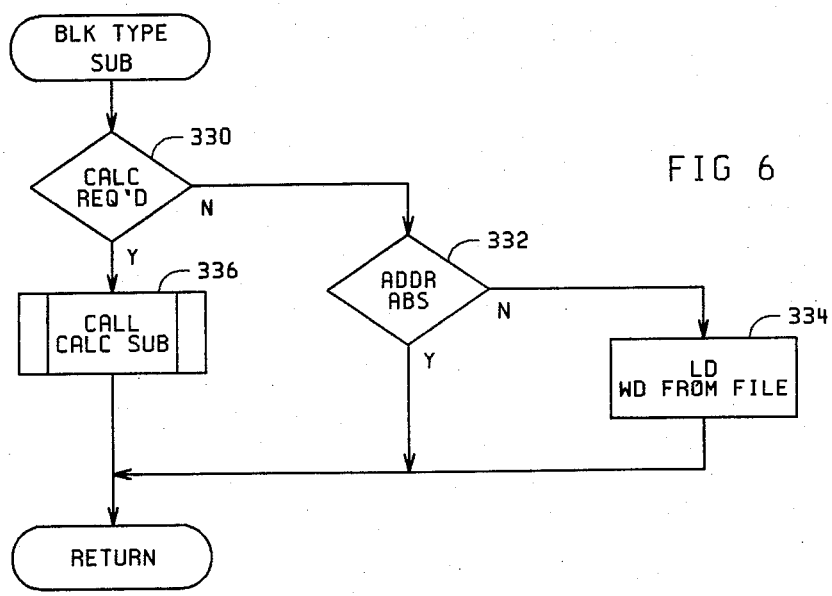
FIG. 6 is a flow chart of operation of a block type subroutine which is exeucted by the procedure of the flow chart of FIG. 5.
Figure 5:
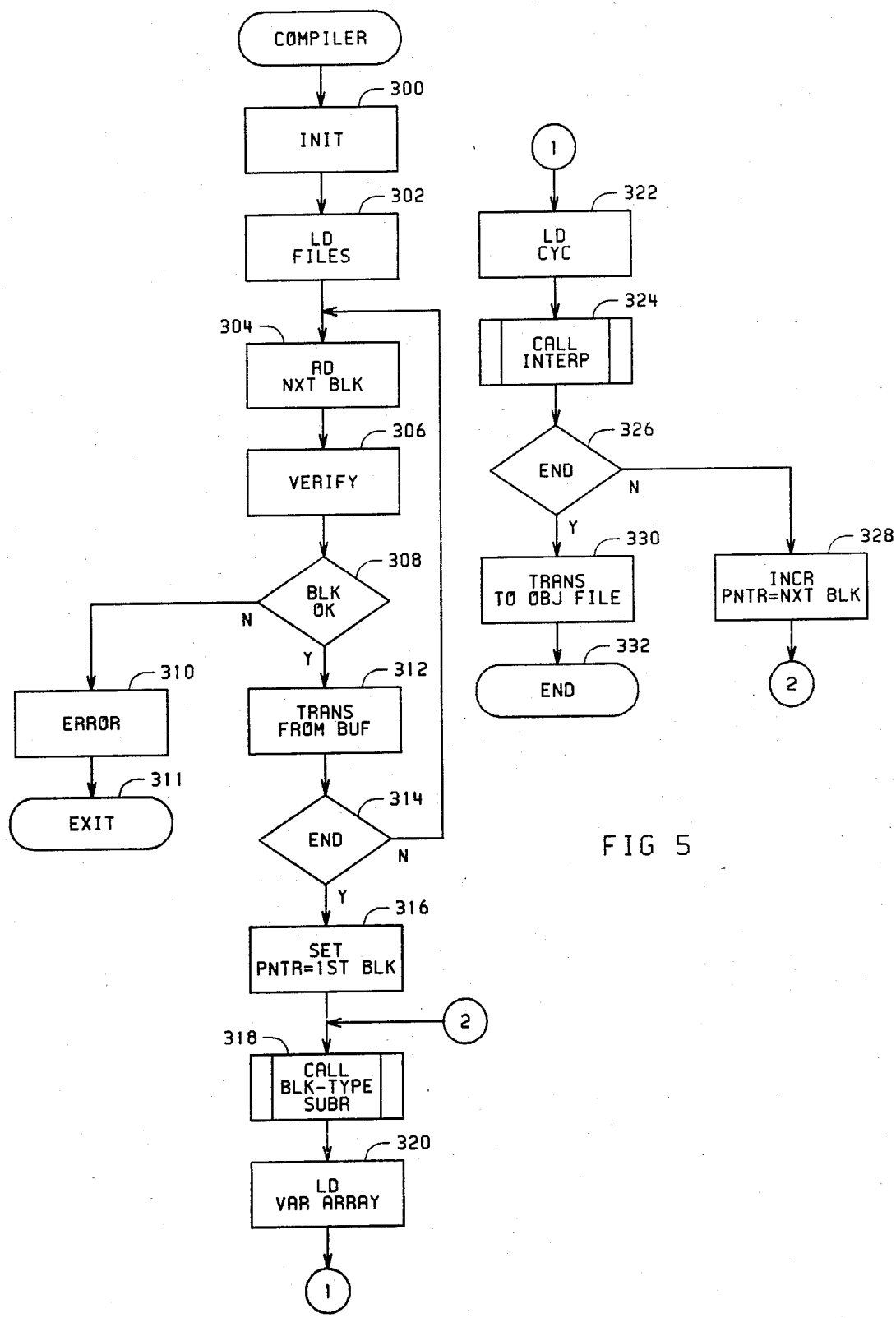
FIG. 5 is a flow chart of operation of a compiling procedure used in processing generalized data programs.

It will be noted from the description of the flow chart of FIG. 5 that following verification of the generalized data program block, the compiler's functions are resolved into two primary operations. First, the compiler effects the execution of the block type subroutine and thereafter effects execution of the interpreter to process the appropriate block type cycle. FIG. 6 is a flow chart of the general process associated with execution of the block type subroutine.

Referring to FIG. 6, it is determined at decision step 330 whether or not any calculation is required for the block type. If no calculation is required, execution proceeds at decision step 322 when it is determined whether or not any addresses have been omitted from the program block. It is to be kept in mind that having verified the block, the absence of option words only is determined by decision step 332. If no optional words were omitted, no additional processing is required, and the execution of the block type subroutine is ended and resumption of execution of the complier program is effected through the return of terminal 338. If at decision step 332, it is determined that option words have been omitted from the generalized data program block the required words are supplied with data from the appropriate file.

If it had been determined at decision step 330 that the block type requires a calculation, the appropriate calculation subroutine is called at process step 336. Thereafter, resumption of the overall processing of the compiler program is effected by the return through terminal 338.

To describe the operation of the interpreter, it will be necessary to describe the structure of the cycles which are executed under the control of the interpreter. In general, the cycles comprise cycle statements including cycle words and variables in the form and format set forth below in Table 3. Further, the cycles include variable machine control instruction blocks with cycle variables in place of fixed constants. The cycle variables in the variable machine control instruction blocks are ultimately replaced by numeric values produced by the execution of the cycle statements. The interpreter effects execution of the cycle statements to evaluate the variables therein and the variables embedded in the machine control blocks and ultimately transfers the machine control instruction blocks with the appropriate numeric data to the object file 126. Cycle statements provide flow control through the cycle as well as logical and arithmetic operations to effect evaluation of variables. Cycle word types and their descriptions are set forth in Table 3 below.

TABLE 3

| Cycle Words | |
|---|---|
| Description | |
| Flow Control (All Wds 6 Char) | |
| IF ... | Statement for comparing two variable values |
| THEN ... | Optional portion of IF statement for labeling point from which cycle execution continues when comparison produces a true result |

TABLE 3-continued

Cycle Words

| | Description |
|---|---|
| ELSE ... | Optional portion of IF statement for labeling point from which cycle execution continues when comparison produces a false result |
| GOTO ... | Labels point cycle execution proceeds unconditionally |
| LAAAAA | Six character word identifying locations in cycle and used in conjunction with THEN, ELSE, and GOTO statements. The same label word will appear once in the flow control statement and once on a separate line marking the execution continuation point in the cycle |
| REPEAT ... TIMES | Introduces a section of cycle to be repeatedly executed the number of times specified by a variable between repeat and ... TIMES |
| ND REPT | Statement marking the end of a section of a cycle which is to be repeatedly executed under control of the repeat statement |
| COMMENT | A nonprocessed statement for providing textual comment in the cycle |
| EXIT ... | Marks the end of a cycle and effects return of program execution to the interpreter program |
| Logical Oper. | |
| !EQUL! | Equality comparison for IF statement, produces true result when compared variable values are equal |
| !NTEQ! | Inequality comparison for IF statement, produces a true result when the compared variable values are not equal |
| !GRET! | Produces a true result for an IF test when variable on left hand side of comparison is greater than variable on right hand side of comparison |
| !LESS! | Produces a true result for IF statement when variable on left hand side of comparison is less than the value of the variable on the right hand side of the comparison |
| !GTEQ! | Produces a true result for the If statement when the value of the variable on the left hand side of the comparison is greater than or equal to the value of the variable on the right hand side of the comparison |
| !LSEQ! | Produces a true result for the If test when the value of the variable on the left hand side of the comparison is less than or equal to the value of the variable on the right hand side of the comparison |
| Arithmetic Operations | |
| #ADDT# | Addition of the values on the left and right hand sides of the operator |
| #SUBT# | Subtraction of the value on the right hand side of the arithmetic operator from the value on the left hand side of the arithmetic operator |
| #MULT# | Multiplication of the values on the left and right hand sides of the arithmetic operator |
| #DIVI# | Division of the value on the left hand side of the arithmetic operator by the value on the right hand side |
| #SINE# | Trigonometric sine of the value following the operator expressed in degrees |
| #COSS# | Trigonometric cosine of the value following the arithmetic operator, the value expressed in degrees |
| #TANG# | Trigonometric tangent of the value following the operator, the value expressed in degrees |
| #ARCT# | Trigonometric inverse tangent of the value following the operator, the value of the result will be expressed in degrees |
| #SQRT# | Square root of the value following the arithmetic operator, the value is assumed positive |
| Variables | |
| V(001)- V(300) | Reserved system variables loaded with values by the compiler |
| V(301)- V(400) | Cycle variables which are written to or read from by cycles |
| V(401)- V(500) | Global variables written and read from by all cycles |
| S01-S25 | These are subscript or counting variables with a range limit of minus 1024 to plus 1024 |
| P01-P05 | A machine process index |

As noted hereinbefore, the cycle statements are intermixed with variable numerical control instruction blocks wherein certain of the block word values are represented by cycle variable means. Evaluation of these variables is accomplished by execution of the cycle statements. The numerical control instruction blocks are output to the object file 126 with the value for these block words in place. The flow control type statements of the cycle are permitted a limited number of forms. Specifically, IF statements are permitted two forms: IF GOTO and; IF THEN ELSE. The GOTO statement is permitted two forms; either conditionally when incorporated in an IF statement or, unconditionally when not. The REPEAT statement may be written in a simple form without an embedded REPEAT statement or it may be written in a compound form where a second REPEAT statement is embedded within the code making up the section to be repeated. Variable statements are permitted in five forms: an equality with a single value, an equality involving a simple expression having a single arithmetic operation, an equality involving a compound expression having two arithmetic operations, a subscript or counting variable being set equal to a numeric constant and a subscript or counting variable being set equal to an expression including an index variable an arithmetic operation and a numeric constant.

Figure 7:
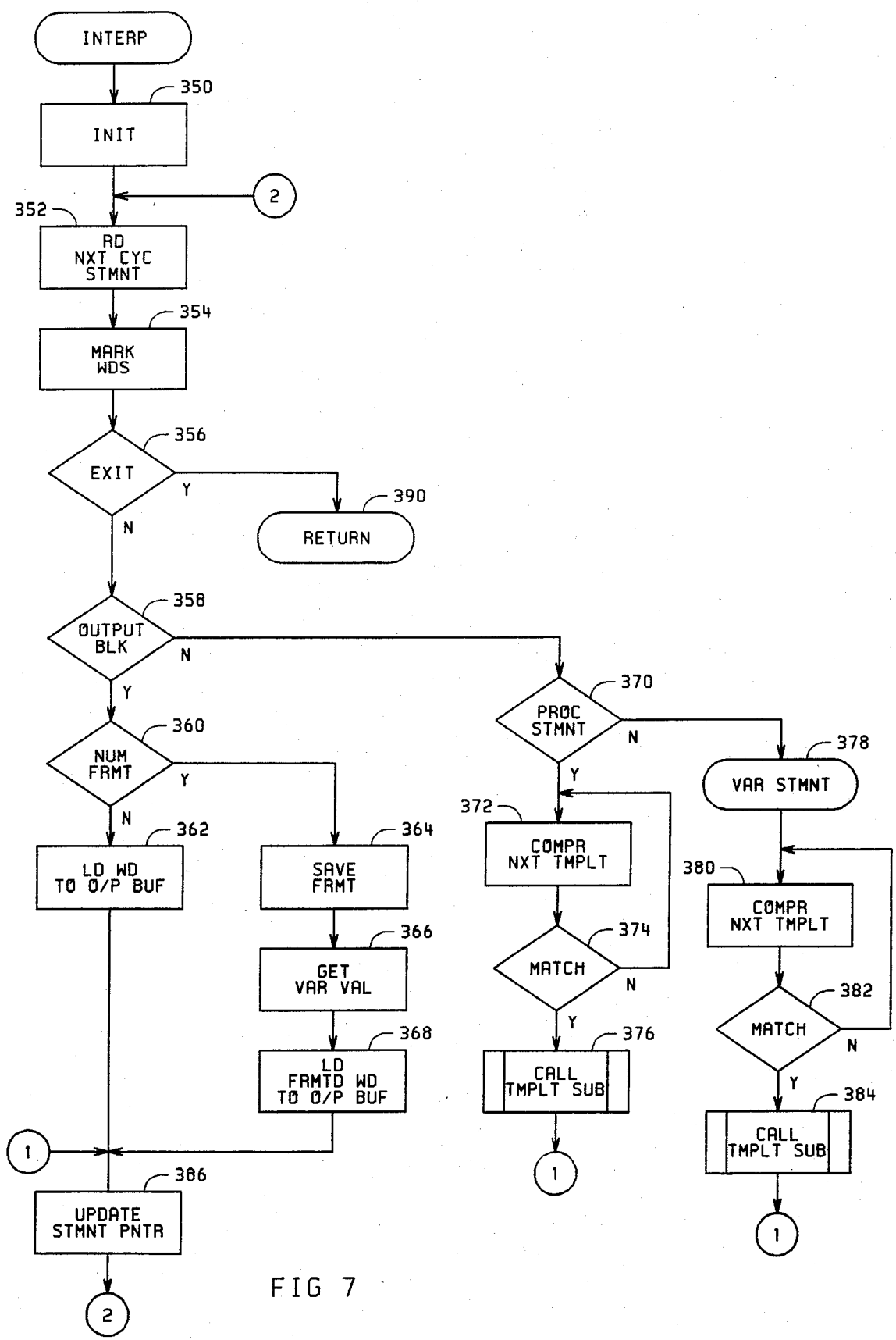
FIG. 7 is a flow chart of an interpreter subroutine which is executed by the procedure of the flow chart of FIG. 5.

The execution of cycles is accomplished under control of the interpreter program. Operation of the interpreter shall be described with reference to the flow chart of FIG. 7. At process step 350, interpreter pointers and process control flags are initialized. At process step 352, the next cycle statement is read by the interpreter. Following initialization by process step 350, the statement read by process step 353 is the first cycle statement of the cycle being executed. At process step 354, the cycle statement is parsed into its component words. At decision step 356 it is determined whether or not the cycle statement being processed is an EXIT statement. If it is, the execution of the cycle is complete and execution of the compiler program is continued by the return through terminal 390.

If the cycle statement being processed is not an EXIT statement, processing of the cycle statement continues at decision step 358 where it is determined whether or not the cycle statement is a variable machine control instruction block. The numerical control instruction blocks incorporated in the cycle are written with numeric format words to conform the format of the control instruction block words to that required by the numerical control. At decision step 360 it is determined whether or not the control instruction block detected by decision step 358 includes numerical format words. If it does, the format code is saved at process step 364. At process step 366 the variable value is retrieved from the variable array and at process 368 the formatted word is loaded to the object buffer. If it had been determined at decision step 360 that no numeric format codes were present in the control instruction block, process steps 364 through 368 would be skipped and the words of the control instruction block would be loaded to the object code file 126 by process step 362. In either event, following the transfer of the control instruction block words to the object file 126 the cycle statement pointer is updated at process step 386. Execution of the cycle statements then continues through the on page connector 2 at process step 352 where the next cycle statement indicated by the cycle statement pointer is read.

As has been described, the cycle flow control statements and variable statements are programmed in a limited number of forms. This limitation facilitates cycle processing by the interpreter which effects execution of cycle statements according to the statement type. To determine cycle statement type, it is only necessary that the interpreter compare the statement form against a permitted form template. Once the statement form has been determined by this comparison procedure, a subroutine for processing the statement can be executed.

Referring again to FIG. 7, it is determined at decision step 370 whether or not the cycle statement being processed is a process or flow control statement. If it is, the cycle statement is compared against the form templates by the loop comprising process step 372 and decision step 374 until a match is found. When the match is found between the permitted form templates and the cycle statement being processed, the appropriate cycle template processing subroutine from the collection of template subroutines 132 is called at process step 376. As it is the function of the flow control statements to result in evaluation of variables which appear in variable machine control instruction blocks, the flow control statement processing does not result directly in loading of any control instruction blocks to the object file 126. Upon completion of the execution of the template subroutine, the cycle statement pointer is updated to indicate the next cycle statement by process step 386. Thereafter, cycle processing continues to the on page connector 2 at process step 352 where the next cycle statement is read.

Had it been determined at decision step 370 that the cycle statement being processed was not a process control statement, and keeping in mind that it would have been determined by decision step 358 that the cycle statement was not a control instruction block, the remaining alternative is that the cycle statement is a variable. This is indicated by the variable statement terminal 378. Variable statements are also required to conform to a limited number of forms and determination of the form of the variable statement being processed is accomplished by process steps 380 and decision step 382 which compare the variable statement to permitted form templates. When a match between the variable statement and a permitted template is determined, the appropriate template subroutine is called by process step 384. Variable statements produce values of variables for execution of the arithmetic operations included in the value expressions. The resultant value is stored in the appropriate location within the interpreter variable array 128. Upon completion of execution of the variable statement template subroutine, processing of cycle statements continues by updating the statement pointer at process step 386 and thereafter resuming execution of cycle statements through the on page connector 2 to process step 352.

The last statement of a cycle is the EXIT statement which will be detected by decision step 356. Cycle statement processing is terminated by the exit statement and returned to the compiler execution is effected through terminal 390.

To better illustrate the relationship between a cycle and the machine control instructions, an example cycle shall be described. It will be noted that dimensional data for each control instruction block included in the cycle is preceded by two format codes used to indicate the appropriate format for inch or metric dimensions.

EXAMPLE CYCLE

```
COMMENT      TAP CYCLE
COMMENT      This is only an example
COMMENT
COMMENT      If tool is at Z axis tool change point
COMMENT      proceed if not rapid to tool change Z point
COMMENT
IF ... V(447)!GTEQ!V(444)GOTO ... L00001
G0Z%34%43V(444)$
L00001
COMMENT
COMMENT
COMMENT      Rapid to tool change X and Y axis locations
COMMENT      change tool, speed, coolant
COMMENT
G0X%34%43V446)Y%34%43V(445)T@OZ@OZV(296)M6$
G@02@V(299)S@04@04V(300)M@02@02@V(295)$
COMMENT
COMMENT      Rapid to tap location in an X,Y then to
COMMENT      work surface plus gage height in Z
COMMENT
G0X%34%43V(002)Y%34%43V(003)$
COMMENT
COMMENT      Set user variable V(301)=to work surface
COMMENT      plus gage height
COMMENT
V(301)=V450#ADDT#V(210)
G0Z%34%43V(301)$
COMMENT
COMMENT
COMMENT
COMMENT      Engage G84, tap to depth, reverse spindle,
COMMENT      tap out to the location specified by variable
COMMENT      V(301). Set variable V(302) = to the
COMMENT      absolute bottom tapped hole by subtracting the
COMMENT      program Z value from the current work
COMMENT      surface
V(302)=V(450)!SUBT!V(293)
G84Z%34%43V(302)L%34%43V(291)$
G84Z%34%43V(301)L%34%43V(291)M4$
COMMENT
COMMENT
COMMENT      Rapid to the rapid tool clearance plane and
COMMENT      update all appropriate global variable values
COMMENT
G0Z%34%43v(443)$
COMMENT
COMMENT      The global variables to contain the spindle
COMMENT      speeds/mode are assumed to be V(401) and
COMMENT      V(402) the variable V(403) contains the tool
COMMENT      pocket number. Update the last known tool
COMMENT      location variables
COMMENT
V(449)=V(002)
V(448)=V(003)
V(447)=V(443)
V(401)=V(300)
V(402)=V(299)
V(403)=V(296)
COMMENT
COMMENT      Return to the interpreter
COMMENT
```

EXIT...

```
            Assumed Variable Values
              V(002) = 7.0000
              V(003) = 6.0000
              V(310) = .1000
              V(291) = .0625±
              V(293) = 1.2500
              V(295) = 8.0000
              V(296) = 23.00000
              V(299) = 97.0000
              V(300) = 200.0000
              V(401) = 400.0000
              V(402) = 96.0000
              V(443) = 14.0000
              V(444) = 19.0000
              V(445) = 13.0000
              V(446) = 15.0000
              V(447) = 15.0000
              V(448) = 10.0000
              V(449) = 9.0000
              V(450) = 8.0000
         Resultant Machine Control Instructions
N0300GOZ190000$
00310GOX150000Y130000T23M6$
N0320G97S0200M08$
N0330GOXY70000Y60000$
N0340GOZ81000$
N0350G84Z67500L625$
N0360G84Z81000L625M4$
N0370GOZ130000$
```

It will be noted that the foregoing is merely an example of a cycle which would be called for execution by a generalized data program TAP block. It will be appreciated that a significantly different cycle could be written for the TAP block type.

It will now be seen that the generalized data program blocks may readily be written with reference to workpiece design data. These blocks do not in general define specific machine motions. However, they do specify sufficient data to permit the generation of machine motion commands. The conversion of generalized data program blocks to control instruction blocks depends upon the structure of the cycle relating the generalized data program block type to desired machine motion definition. Consequently, machine and control combinations having significant differences may nevertheless be used to perform the desired machining operations as directed by the generalized data program provided that the necessary interpretive cycles are available for conversion of the generalized data program to machine instruction blocks. The comparative ease of program revision by a machine operator is a direct consequence of the structure of the generalized data program blocks to permit data definition using the workpiece design data. The operator performing program revisions is not required to have specific knowledge as to the appropriate word coding for a specific machine and control combination. Coding variations from one machine and control combination to another are readily accommodated by the cycles. Further convenience for the operator is provided by the graphics editor which imposes the necessary program structure by means of menu control. The operator is thus permitted to provide the required material, work surface, feature, and machining operation data in the appropriate order to achieve the desired workpiece processing.

While the invention has been described with reference to the preferred embodiment, and while the preferred embodiment has been described in considerable detail, it is not intended to in any way limit the scope of the present invention to such detail. Rather, it is the intention of applicant that the present invention cover all modifications, alterations and equivalents falling within the spirit and scope of the appended claims.

It is noted in particular that while the preferred embodiment pertains to milling and drilling operations, an analogous approach could be used for the creation and revision of generalized data programs for turning operations. Again, a relatively simple two dimensional graphic representation of the profile of the workpiece would suffice for the definition of workpiece features. A variety of feature types generally categorized as to inside and outside diameters and including tapers, radii, filets, chamfers and necks can then be defined. The workpiece profile may further be defined by inside and outside corners with which selected features are associated. Outside and inside corners are identified moving from the front to the rear of the workpiece and the various available feature types associated with inside and outside turning operations are then selected and specified for each corner. As in the case of milling operations, predefined shapes as well as free-form shapes can be accommodated.

It will be further noted that while the preferred embodiment has been described with particular reference to its operating environment, other hardware arrangements would be equally suitable. Were sufficient processing capability and memory capacity provided within a numerical control it would not be necessary to require communication between the numerical control system and an independent computer processor. Further, other graphic representations than those suggested herein could be readily adapted for the creation and revision of programs as described.

What is claimed is:

1. A method for creating and revising programs for a numerically controlled machine, the numerically controlled machine having movable members responding to control signals produced by a numerical control in response to machine control instructions blocks, the machine and control effecting relative motion between a workpiece and tool to perform machining operations on the workpiece, the method comprising the steps of:
   a. producing generalized data block signals representing sets of alphanumeric words, each generalized data block having one block type word defining the block type and at least one data word defining a data value associated with the block type, the generalized data block selectably describing a workpiece material, a workpiece surface, workpiece features, and machining operations, wherein the data type of each data word is designated by an alphabetic character and the data definition of each alphabetic character is determined by the block type word; and
   b. producing machine control instruction block signals in response to the generalized data block signals, the machine control instruction block signals representing sets of alphanumeric words describing machine member motion, the machine control instruction block signals conforming to the form and format required by the machine control.

2. The method of claim 1 wherein the step of producing machine control instruction block signals further comprises the steps of:
   (a) storing cycle signals representing cycle statements and variable machine control instruction blocks, each cycle being associated with a selected generalized data block type and defining a sequence of steps for producing machine control instruction block signals; and (b) executing a cycle in response to a selected generalized data block type to produce machine control instruction block signals.

3. The method of claim 2 wherein the cycle statements include comparative and arithmetic expressions relating variables and the step of executing cycles further comprises the steps of:

(a) producing variable value signals in response to the comparative and arithmetic operation cycle statements; and (b) substituting the variable value signals in the variable machine control instruction blocks to produce the machine control instruction block signals.

4. The method of claim 1 wherein producing generalized data block signals futher comprises the steps of:

(a) identifying a workpiece material type;

(b) specifying work surface location data defining the location of a work surface upon which machining operations are performed;

(c) specifying work surface feature data defining characteristics of a feature to be machined in the work surface; and (d) specifying machine operation data defining machining operations associated with a specified feature.

5. The method of claim 4 wherein the step of producing machine control instruction block signals futher comprises the steps of:

(a) storing generalized data block verification data signals representing verification data for selected words of the generalized data blocks;

(b) comparing generalized data block signals representing alphanumeric words of the generalized data block with generalized data block verification signals;

(c) producing an error signal in response to detecting the absence of words required for the generalized data block type; and (d) producing an error signal in response to detecting values of alphanumeric words of the generalized data block beyond limits defined by the generalized data block verification signals.

6. The method of claim 5 wherein the step of producing machine control instruction block signals further comprises the step of:

(a) storing material data signals representing spindle speeds, feed rates, and coolant control data associated with selected machining operations in selected workpiece materials; and (b) producing the required machine control instruction block values for spindle speeds, feed rates, and coolant control in response to the material data signals and the selected workpiece material.

7. The method of claim 6 wherein the step of producing machine control instruction block signals further comprises the steps of:

(a) storing tool data signals representing the tool type, tool identification, tool location, tool dimensions, number of tool teeth, and flute angle; and (b) producing variable value signals for a machine control instruction block word associated with tool identification in response to the tool data signals and the machining operation data of the generalized data blocks.

8. A method for creating and revising programs for a plurality of numerically controlled machines, each numerically controlled machine having movable members responding to control signals produced by a machine control in response to a program of machine control instruction blocks, the machine and control effecting relative motion between a workpiece and a tool to perform machining operations on the workpiece, the method comprising the steps of:

a. producing generalized data block signals representing sets of alphanumeric words, each generalized data block having one block type word defining the block type and at least one data word defining a data value associated with a block type, the generalized data block selectably describing a workpiece material, a workpiece surface, workpiece features, and machining operations, wherein the data type of each data word is designated by an alphabetic character and the data definition of each alphabetic character is determined by the block type word; and b. identifying a machine and control for which machine control instruction blocks signals are to be produced; and c. producing machine control instruction block signals in response to the generalized data block signals and the identified machine and control, the machine control instruction block signals representing sets of alphanumeric words describing machine member motion, the machine control instruction blocks conforming to the form and format required by the machine control.

9. The method of claim 8 wherein the step of producing machine control instruction blocks further comprises the steps of:

(a) storing a plurality of sets of cycle signals, the cycle signals representing cycle statements and variable machine control instructions, each cycle being associated with a selected generalized data block type and for producing machine control instruction block signals, and each set of cycles being associated with a machine and control combination;

(b) selecting a set of cycle signals associated with a machine and control in response to the identification of the machine and control for which machine instruction block signals are to be produced; and (c) executing the selected set of cycles in response to generalized data block types to produce the machine control instruction block signals.

10. An apparatus for creating and revising programs for a numerically controlled machine, the numerically controlled machine having movable members responding to control signals produced by the machine control in response to a program of machine control instructions blocks, the machine and control effecting relative motion between a workpiece and a tool to perform machining operations on the workpiece, the apparatus comprising:

a. means for producing generalized data block signals representing sets of alphanumeric words, each generalized data block having one block type word defining the block type and at least one data word defining a data value associated with a block type, the generalized data block selectably describing a workpiece material, a workpiece surface, workpiece features, and machining operations, wherein the data type of each data word is designated by an alphabetic character and the data definition of each alphabetic character is determined by the block type word; and b. means for producing machine control instruction block signals in response to the generalized data block signals the machine control instruction block signals representing sets of alphanumeric words describing machine member motion, the machine control instruction blocks conforming to the form and format required by the machine control.

11. The apparatus of claim 10 wherein the means for producing machine control instruction block signals further comprises:

a. means for storing cycle signals representing cycle statements and variable machine control instruction blocks, each cycle being associated with the selected generalized data block type and defining a sequence of steps for producing machine control instruction block signals; and b. means for executing a cycle in response to generalized data block signal to produce machine control instruction block signals.

12. The apparatus of claim 11 wherein the cycle statements include comparative and arithmetic expressions relating variables and the means for producing machine control instruction block signals further comprises:

a. means responsive to the comparative and arithmetic expressions of the cycle statements for producing variable value signals representing values of variables associated with the words of the variable machine control instruction blocks; and b. means for substituting the variable value signals in the variable machine control instruction blocks to produce the machine control instruction block signals.

13. The apparatus of claim 70 wherein the means for producing generalized data block signals further comprises:

a. means for displaying graphic representations associated with selected block types, the graphic representations including identifying alphabetic characters of words of the generalized data block;

b. means responsive to the display means for selecting a data word of the generalized data block; and c. means responsive to the selecting means for entering data to produce generalized data block signals representing an alphanumeric word.

14. The apparatus of claim 13 wherein the means for producing machine control instruction block signals further comprises:

(a) means for storing generalized data block verification data signals;

(b) means for comparing selected alphanumeric words of the generalized data block with generalized data block verification data signals;

(c) means for producing an error signal in response to detecting the absence of alphanumeric words required by the generalized data block type; and (d) means for producing an error signal in response to detecting a value of a generalized data block alphanumeric word beyond a limit defined by the generalized data block verification signals.

15. The apparatus of claim 14 wherein the means for producing machine control instruction block signals further comprises:

(a) means for storing machine parameter data signals representing machine member travel limits, spindle speed limits, and spindle power limits;

(b) means for comparing selected alphanumeric words of the generalized data block signals with machine parameter data signals; and (c) means for producing an error signal in response to detecting an alphanumeric word of the generalized data block in excess of the limits defined by the machine parameter data signals.

16. The apparatus of claim 15 wherein the means for producing machine control instruction blocks further comprises:

(a) means for storing material data file signals representing spindle speeds, feed rates, and coolant control data associated with selected machining operations in selected material types; and (b) means responsive to the generalized data block signals and the material data file signals for selecting spindle speeds, feed rates, and coolant control data for a selected machining operation in a selected material.

17. The apparatus of claim 16 wherein the means for producing machine control instruction block signals further comprises:

(a) means for storing tool data signals representing the location, identification, type, and dimensions of tools available on a machine; and (b) means responsive to the generalized data block signals and the tool data signals for selecting an available tool for a selected machining operation.

18. The apparatus of claim 17 further comprising:

(a) means for receiving tool data signals from the machine control; and (b) means for receiving machine parameter data signals from the machine control.

19. The apparatus of claim 18 further comprising means for transmitting machine control instruction block signals to the machine control.

20. An apparatus for creating and revising programs for a plurality of numerically controlled machines, each numerically controlled machine having movable members responding to control signals produced by a machine control in response to a program of machine control instruction blocks, the machine and control effecting relative motion between a workpiece and a tool to perform machining operations on the workpiece, the apparatus comprising:

a. means for producing generalized data block signals representing sets of alphanumeric words, each generalized data block having one block type word and at least one data word defining a value associated with a block type, the generalized data block selectably describing a workpiece material, a workpiece surface, workpiece features, and machining operations, wherein the data type of each data word is designated by an alphabetic character and the data definition of each alphabetic character is determined by the block type word;

b. means for identifying a machine and control for which machine control instruction block signals are to be produced; and c. means responsive to the machine and control identifying means and the generalized data block signals for producing machine control instruction block signals, the machine control instruction block signals representing sets of alphanumeric words describing machine member motion, the machine control instruction blocks conforming to the form and format required by the machine control.

21. The apparatus of claim 20 wherein the means for producing machine control instruction block signals further comprises:

a. means for storing a plurality of sets of cycle signals the cycle signals representing cycle statements and variable machine control instruction blocks, each cycle being associated with a selected generalized data block type and defining a sequence of steps for producing machine control instruction block signals and each set of cycles being associated with a machine control combination;

b. means responsive to the identification of the machine and control for selecting a set of cycle signals; and c. means for executing a selected set of cycles in response to the generalized data block signals to produce the machine control instruction block signals.

22. The apparatus of claim 21 further comprising:

(a) means responsive to the identification of a machine and control for receiving from the selected control tool data signals representing the identification, type, dimensions, and locations of tools available on the selected machine;

(b) means responsive to the identification of a machine and control for receiving from the selected control machine parameter data signals representing machine member travel limits, spindle speed limits, and spindle power limits of the selected machine; and (c) means responsive to the identification of a machine and control for transmitting machine control instruction block signals to the selected machine control.

* * * * *